United States Patent [19]
Shaffer

[11] Patent Number: 5,817,243
[45] Date of Patent: Oct. 6, 1998

[54] METHOD FOR APPLYING DECORATIVE CONTRAST DESIGNS TO AUTOMOTIVE AND MOTORCYCLE PARTS USING LASERS

[76] Inventor: Wayne K. Shaffer, 16 Katsura Ct., Penfield, N.Y. 14526

[21] Appl. No.: 740,443

[22] Filed: Oct. 30, 1996

[51] Int. Cl.[6] .................................................. B44C 1/22
[52] U.S. Cl. ................................................ 216/65; 216/54
[58] Field of Search ................................ 216/65, 66, 54; 219/121.69

[56] References Cited

U.S. PATENT DOCUMENTS

| | | |
|---|---|---|
| 17,140 | 4/1857 | Dufresne . |
| 4,061,799 | 12/1977 | Brewer . |
| 4,210,695 | 7/1980 | Hirono et al. . |
| 4,425,184 | 1/1984 | Guerra et al. . |
| 4,525,044 | 6/1985 | Bauman . |
| 4,786,362 | 11/1988 | Ritzenhoff . |
| 4,959,275 | 9/1990 | Iguchi et al. ........................ 216/65 X |
| 4,999,083 | 3/1991 | Watanabe et al. . |
| 5,175,043 | 12/1992 | Yabe et al. ........................ 216/65 X |
| 5,284,536 | 2/1994 | Gruber . |
| 5,505,320 | 4/1996 | Burns et al. . |
| 5,567,207 | 10/1996 | Lockman et al. . |

*Primary Examiner*—William Powell
*Attorney, Agent, or Firm*—Cumpston & Shaw

[57] ABSTRACT

A method for creating a decorative contrast design on motorcycle and automobile parts by acquiring a decorative design into a computer connected to a laser and X-Y positioning galvanometers and controlling the laser pulse rate and fluence as the beam is scanned across the part according to a program to effect the acquired decorative contrast design on the part surface.

26 Claims, 1 Drawing Sheet

METHOD FOR APPLYING DECORATIVE CONTRAST DESIGNS TO AUTOMOTIVE AND MOTORCYCLE PARTS USING LASERS

FIELD OF THE INVENTION

The present invention relates to the field of decorating plastic, glass, metals and leather, and more particularly methods for transferring decorative contrast designs to motorcycle and automotive parts using a laser.

BACKGROUND OF THE INVENTION

In the motorcycle and automotive industry, many methods have been used to decorate chrome, plastic, plated metals, mirrors and painted surfaces. Prior methods include custom painting, applying decals, molding and silk screening. While paint technology and application techniques have improved, such materials and methods are not conducive to cost-effective mass-production with precise reproducibility. Further, paint, decals and silk screened designs are not permanent, but may chip or become otherwise marred over time when exposed to the elements.

Lasers have been used in automated assembly lines for cutting, heating and curing applications. In addition, the use of lasers to mark indicia into plastic parts, such as contact lenses for identification and orientation purposes is known. However, such surface markings are designed to be small and unobtrusive to the eye when the product is in use. A method comprising use of a laser to permanently etch a complex, well-contrasted computer-programmed design into a glass, metal, plated metal or plastic automotive or motorcycle part is not known.

SUMMARY OF THE INVENTION

The present invention relates to a method for permanently decorating motorcycle and automobile parts, wherein a part is provided along with a programmable computer-controlled laser assembly capable of emitting a beam. The computer acquires a desired image, such as by scanning the image. The computer is programmed to control the pulse rate and X-Y movement of the laser beam across the part surface to effect a desired design on the part. The beam is then directed and scanned over the part, with the programmed design permanently transferred to the part.

A further embodiment of the present invention relates to a method for creating a decorative contrast design on motorcycle and automobile parts by providing a metal or metal-plated motorcycle or automobile part having a surface, and a programmable computer-controlled laser assembly capable of emitting and scanning a laser beam having a desired fluence. Data representing a decorative contrast design is stored in the computer as the design is acquired into the system. The laser fluence is adjusted to remove a desired amount of material per pulse from the part surface, and the scanning rate is selected and input into the computer. The computer is then programmed to pulse and orient the laser in a specified position to effect a reproducible desired decorative contrast design on the part surface. The laser is turned on and the beam is directed to, and scanned over the part surface, transferring the programmed decorative contrast design into the part leaving etched and unetched portions on the part surface. When the part comprises a metal or metal plating or coating, the part is then reacted with an oxidizing agent to increase the contrast of the decorative design between the etched and unetched part surfaces.

A still further embodiment of the present invention relates to a method for creating a decorative contrast design on plastic motorcycle and automobile parts by providing a plastic motorcycle or automobile part and a programmable computer-controlled laser assembly capable of emitting and scanning a laser beam having a desired fluence. Data representing a decorative contrast design is stored in the computer as the design is acquired into the system. The laser fluence is adjusted to cause a discoloration of the plastic and create an image within the translucent or transparent plastic globes and lenses. The scanning rate is selected and input into the computer. The computer is then programmed to pulse and orient the laser in a specified position to effect a reproducible desired decorative contrast design in the part. The laser is turned on and the beam is directed to, and scanned over the part surface, transferring the programmed decorative contrast design into the part. Alternatively, the beam may also be scanned across the surface to etch the design into the part surface.

Another embodiment of the present invention relates to a method for creating a decorative contrast design on mirrored motorcycle and automobile parts by providing a mirror, and a programmable computer-controlled laser assembly capable of emitting and scanning a laser beam having a desired fluence. Data representing a decorative contrast design is stored in the computer as the design is acquired into the system. The laser fluence is adjusted to remove a desired amount of material per pulse from the front or coated back surface of the mirror, and the scanning rate is selected and input into the computer. The computer is then programmed to pulse and orient the laser in a specified position to effect a reproducible desired decorative contrast design on the part surface. The laser is turned on and the beam is directed to, and scanned over the part surface, transferring the programmed decorative contrast design into the part leaving etched and unetched portions on the part surface. The mirrored part is then optionally coated with a paint or holographic coating to increase the perceived contrast of the decorative design between the etched and unetched surfaces.

DETAILED DESCRIPTION OF THE INVENTION

Figure 1:
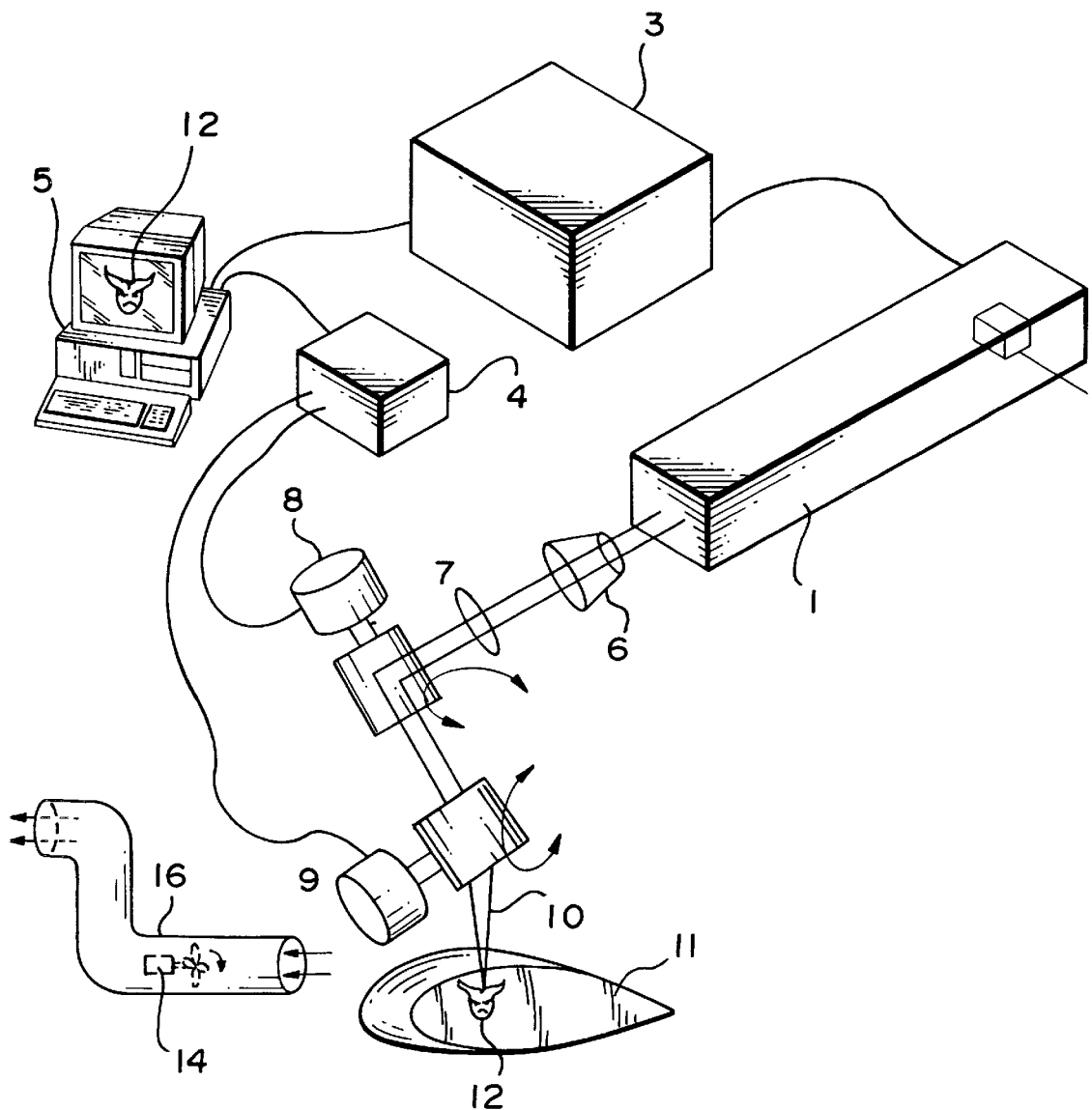
FIG. 1 is a schematic representation of the system of the present invention.

FIG. 1 shows a schematic representation of the system of the present invention. A laser 1 having an acousto-optic modulator 2 is attached to a laser power supply 3. A computer 5 is connected to the laser scanner drivers 4 and X-axis galvanometer scanner 8 and Y-axis galvanometer scanner 9. Beam 10 is emitted from the laser 1 and directed through beam expander 6 and focusing lens 7. The beam is then redirected by the X-axis scanner 8 having mirror 8a and Y-axis scanner 9 having mirror 9a. The beam then impacts the part 11, etching the permanent decorative contrast design 12 into the part 11. Blower motor with fan 14 inside vent assembly 16 creates a vacuum which removes debris from the environment surrounding the part surface.

According to the invention, the first step in the process of the present invention is to acquire the decorative image to be transferred to the automotive or motorcycle part. The desired image or design to be transferred is initially provided to the screen of a flatbed scanner. The image may also be, for example, the result of a digital photograph stored on a photo CD, or the product of a CAD (computer aided program), or a commercially available computer drawing program.

The image may be processed by either raster images or vector images. Raster images are images made up of picture elements (dots) or pixels. These images include most photographic and drawing program images. For the present invention, it is preferred that the image size be scaled to match the desired resolution of the final image on the part. Further, the image color depth (number of colors) must be reduced to only two levels: black and white. The black will preferably correspond to a "laser on" pulse mode and the white will correspond to a "laser off" pulse mode. The processed image should then be saved as either a BMP (bitmap) or PCX file format (e.g. Microsoft Paintbrush™) for image file conversion.

Vector images are line images such as, for example, those generated in CAD programs. Vectors in the CAD program have a start coordinate, a stop coordinate, and a corresponding angle. Each line of the design to be transferred to the part in vector mode has a start position corresponding with the start coordinate in the CAD program, a stop position corresponding with the stop coordinate in the CAD program and an angle also coordinated with the CAD program. Each line or vector in the vector mode is preferably one laser scan in the laser etched image on the part. Vector images are preferably saved as a PLT (plot file) file format which is accepted by the selected laser control program (e.g. Prolase™, American Laserware, Inc., Orlando, Fla.).

The acquired image must undergo file conversion to enable the computer system to direct the laser to scan the image onto the part surface. This includes: 1) a BMP (bitmap) to PLT (plot file) conversion; 2) PLT (plot file) being directly read by computer control system (CCS) (e.g. Prolase™); and 3) PCX directly read by the CCS (e.g. Prolase™). PLT is the extension and file format for the HP plotter. PXC is the extension and file format for the program PC Paintbrush™. Preferably, once the CCS has read in a PLT or PCX file image, the image can then be manipulated relative to size and orientation requirements. The user can adjust image height, width and image rotation with respect to the marking field.

The CCS is a preferably a custom laser scanner computer control program which allows the user to control a galvanometer-based laser scanner. For example, the Prolase™ system requires preferably a 486-DX other board running at least 60 MHz with 8 MB of RAM and a large (1 GB) hard drive. For the laser imaging of the present invention, 100 Mhz and 16 MB are required. CCS sends digital control signals to a DADIO I/O board—a computer board which plugs into an ordinary 8-bit slot on a PC compatible computer. The DADIO board converts the signals to analog voltages which are used to control the laser power, pulse rate and galvanometer scanning movements.

Preferably, scan velocity is controlled from the user's CCS interface. After software calibration, the focused laser spot velocity on the work piece can, for example, be adjusted in units of inches per second. The pulse rate is controlled by the CCS interface by setting the pulse rate in pulses per second. A special signal from the DADIO card is used to control the laser Q-switch which pulses the laser when required. The laser power or fluence (laser lamp current) is adjusted from the CCS interface in units of percent of power or watts.

The laser system may be any laser system which can deliver a pulsed or continuous beam of sufficient fluence to a substrate and cleanly etch or ablate materials without charring the substrate material. The lasers contemplated for use in connection with the present invention include excimer lasers, carbon dioxide lasers, and neodymiun doped lasers, such as Nd:YAG, etc. Preferably, the laser is a Nd:YAG laser (neodymium doped yttrium aluminum garnet) pumped with a krypton arc lamp. The laser power is preferably controlled by adjusting krypton arc lamp current. The laser power is preferably adjustable between less than one watt to over 1000 watts average power.

The laser intensity or energy (power per pulse or fluence) is from about 0.5 mJ to about 250 mJ, more preferably from about 2 mJ to about 5 mJ, but is adjustable and made to correspond to the desired effect on the material provided.

It is understood that automobile and motorcycle parts may be metal, plated metal, plastic or mirrored glass. Each of these materials has an inherent laser ablation threshold. Ablation refers to the process by which energy is supplied to a site causing excitation of the material at an atomic level causing an eruption or explosion of material from the site as bonds are broken at the atomic level releasing material from the site in a predictable pattern to a predictable depth. For the purpose of the present invention, ablation is understood to occur with such rapidity that no charring or burning occurs at the ablation site.

Ablation threshold refers to the amount of energy required to overcome a material's atomic bond strength. It is therefore contemplated that the laser selected can deliver a beam to a location or site on the part surface at a desired fluence sufficient to overcome the part's ablation threshold. It is further contemplated that the ablation can be effected such that etches of varying depths into the part throughout the design are achieved without charring or burning the etched areas. Instead, material from the etched areas is cleanly ablated. However, if desired the laser used in the present invention can anneal a metal or metal-plated surface rather than ablate it.

In a preferred embodiment, an acousto-optic beam modulator is present within the laser resonator. The present device distinguishes the beam at rates of about 500 Hz to about 30 kHz. A q-switch enables peak laser power to reach much higher levels. The peak power of the system of the present invention reaches from about 1 watt to about 500 kilowatts, and is preferably about 60 kilowatts.

The materials which can be ablated according to the present invention include metals, plated metals, plastics, mirrored glass and leather. The preferred metals include stainless steel, aluminum, aluminum-containing alloys, stainless steel, nickel, nickel-containing alloys, carbon steel, zinc, zinc alloys, titanium and mixtures thereof. The plastics may be polycarbonate (Lexan™), Lucite™, acrylic, and polystyrene with plastics such as polycarbonate that can be molded into transparent or translucent lenses for automobile or motorcycle light globes and lenses being particularly preferred.

The pulse rate of the laser is set coordinate with the laser power to achieve the desired laser fluence, but must at least produce laser pulses of from about 0.5 mJ to about 20 mJ, more preferably from about 1 mJ to about 2 mJ at peak power of from about 8 kW to about 20 kW.

It is understood that the fluence of the laser beam may be set to ablate to varying depths into the part as desired. When the part is a metal plated part, the laser may ablate to a thickness less than, equal to, or greater than the thickness of the plating itself, depending only upon the effect to be achieved. The metal plating may be any plating but is preferably chrome, anodized nickel, silver, gold, brass, copper and alloys hereof, with chrome being particularly preferred.

When the part material is plastic (such as for a clear or colored light lens or globe), the laser etch may desirably leave etched areas opaque to enhance the overall decorative contrast of the design, both when light is and is not directed through the part. Further, the laser may be set to affect the plastic between the front and back surfaces of the part. In other words the beam may be focused to a point within the plastic part. In this way, the image is formed by affecting, such as by discoloring, portions of the plastic within the part. This is highly desirable, since it has been discovered that when the image is transferred to a spot within the part, the plastic globe or lens so marked will not adversely affect transmission of a light beam through the plastic globe or lens.

When the part is mirrored glass, the contrast is enhanced by applying a coating to the etched mirror backing. The coating may be any color paint as desired, or may be a holographic sheet. When viewed through the front of the mirror, such back coatings give an excellent life-like appearance to the decorative contrast design. The laser beam may be directed to the back coated surface to remove portions of the coated surface. Also, the laser beam may be directed through the front surface of the glass mirror and then "blast off" or ablate portions of the back coating. Still further, the laser beam may be focused to the front of the glass mirror surface and simply ablate the front surface of the glass (or coating if such a front coating is used). When the coated reflective backing of the mirror has been ablated, the design may be coated by painting or by applying a holographic coating to add to the decorative and highly contrasting appearance. In all instances, accomplishing a decorative contrast design gives the design a three dimensional appearance with an excellent life-like depth of image.

According to the present invention, as the beam is scanned across the surface of the part being decorated, computer-controlled X and Y galvanometers move to position the beam appropriately. When the beam etches or ablates material from the part surface, this material or debris can adversely interfere with the pattern being etched. Therefore either a steady vacuum or air stream, or both is provided adjacent the part surface to keep ablated debris from settling on the part surface in the path of the laser. In addition, a vacuum assists in extracting from the manufacturing environment harmful volatiles which are sometimes liberated when organic materials are ablated.

In further preferred embodiments, beam expanders, apertures and focusing mirrors may be placed in the laser beam's path as desired to condition the beam.

To acquire the desired decorative images for the examples listed below, a Hewlett-Packard Scanjet II™ was used. The "dot" density of the scan was selected as follows. For a 1 inch design output on a chrome motorcycle gas cap, the desired image was a two inch image drawn on an 8.5"×11" sheet of paper. The laser was set up to make a dot size of 0.004 inch or 250 dots per inch (DPI). The image is then scanned at a dot resolution to give 250 DPI on the chrome. Since the desired output image on the part is one inch and the image is drawn at two inches, the scanner resolution was set up for 125 DPI.

Next, the scanned image must be converted to a PLT format that can be accepted by the selected laser CCS. Custom software facilitated converting BMP format to PLT format. Each pixel of a bitmap is converted to a very short vector, creating a dot on the target (part) surface. PLT and PCX files are loaded onto a disk in a specified directory under the CCS and interpreted for laser marking. The CCS directs the laser marking apparatus to map the plot file with the laser beam.

The laser system used was a YAG laser, specifically a Nd:YAG laser (neodymium doped yttrium aluminum garnet) pumped with a krypton arc lamp. Preferably, the laser mode may be switched from a fundamental small spot mode having an aperture in place (TEMoo) to a larger spot size mode without an aperture present (multimode). Laser power (watts) is controllable by adjusting krypton arc lamp current. The laser power is adjustable from less than 1 watt to more than 75 watts. The laser resonator has an acousto-optic beam modulator (q-switch). This device distinguishes the beam at rates of from about 500 Hz to about 30 kHz. The q-switch enables enhanced peak power of up to about 60 kWatts. A beam expander is used to expand the beam so that scanning mirrors are not harmed.

Lastly, to achieve an enhanced image contrast, the laser etched metal and metal plated automotive or motorcycle parts are subjected to an oxidation step comprising exposure to an oxidative agent solution bath or mist, including a dip or spray or direct brushing, followed by rinsing in, for example, an aqueous bath. The specific oxidative agent selected must adequately react with the etched part surface to cause increased contrast visibility between the etched and unetched part surfaces. This results in a decorative design having enhanced visibility due to its overall contrast. Preferred oxidative reagents include solutions of selenium oxide, caustic soda, sodium nitrate, sodium dichromate, potassium nitrite and potassium nitrate, with a 20 wt. % solution of selenium oxide being particularly preferred for parts comprising metals or plated metals. The oxidative reaction preferably occurs within a reasonable amount of time, such as about 0.5 to about 5 minutes, and will depend upon which metal material the part is comprised of.

It is to be understood that the laser beam scanning the part may itself move or be directed to move via moving mirrors, lenses, the laser itself etc. over a stationary part. Further, the laser beam may be held stationary relative to a moving stage or platen holding the part.

The following examples serve only to further illustrate aspects of the present invention and should not be construed as limiting the invention.

EXAMPLE 1

Laser Decorating Chrome-Plated Aluminum and Chrome-Plated Steel

The computer-programmed laser apparatus was set up as described above. The decorative image was acquired and processed as described. A chrome plated motorcycle gas cap was placed within the laser scanning field. The appropriate size and orientation of the image was adjusted. The power on the laser was set at 17 watts average power. The Q-switch rate was 5 kHz, the scan velocity set at 5 inches/sec, and the krypton arc lamp set at 32 Amps.

Throughout the scan the part is located within the beam's focus. As the laser scans the part, ablation debris is created. The debris was removed from the surface by vacuum supplied by a fan blower assembly positioned adjacent the part. After the scan was completed and the image transferred to the part, the part was removed from the platen, wiped clean with a cotton cloth and dipped into a selenium oxide bath for 90 sec. at 20° C. The part was then removed from the oxidizing bath and flushed with water and allowed to dry. The finished part displayed a highly contrasted image that precisely replicated the acquired image from the computer. The entire imaging process from image acquisition to scanning completion took 3 minutes. This is in strong contrast to airbrushing design which take many hours. Further, painting could not achieve the clean result on the chrome surface achieved by computer assisted etching. Separate experimental runs were repeated for 20, 25, 30 and 32 Amps arc lamp current, with the best results obtained at 32 Amps.

EXAMPLE 2
Laser Decorating Stainless Steel

An image was acquired and processed into the computer as described above. The stainless steel part was placed within the laser scanning field on a platen to hold the part at all times within the laser beam's focus. The size and orientation of the image was adjusted. The laser power was set at 40 watts. The laser mode was multimode (no aperture). The laser q-switch rate was 20 kHz with the scan velocity set at 1 inch/second. The laser was turned on and the image was laser annealed into the part surface. The decorative image was successfully annealed into the stainless steel part surface with a superior contrast shading effect. Separate runs were repeated for 25, 30, 32 and 35 Amps arc lamp current. The best result was achieved at 35 Amps. At 35 Amps with a low scan rate, laser annealing is effected. No ablation is caused by the annealing.

EXAMPLE 3
Laser Decorating Plastic

An image is acquired and processed by the computer as described above. A polycarbonate plastic lens (Lexan™, DuPont, Delaware) for a motorcycle lamp was positioned within the laser scanning field. The size and orientation of the image was adjusted. The laser power was set at 6.5 watts average power. The laser mode was multimode with no aperture used as a bold image was desired. The laser q-switch rate was set at 5 kHz with a scan velocity of 2 inches/second. The lamp arc current was optimally found to be 25 Amps. The laser was turned on an the image was laser etched into the part surface. A dark contrasting image was observed when light was directed to the plastic. Separate runs were repeated for 15, 20, 25 and 30 Amps arc lamp current, with the best results obtained at 25 Amps.

EXAMPLE 4
Laser Decorating Painted Metal & Painted Plastic

An image was acquired and processed into the computer as described above. The enamel painted cold roll steel part was placed within the laser scanning field on a platen to hold the part at all times in focus. The size and orientation of the image was adjusted. The laser power was set at 7.4 watts average power. The laser mode was TEMoo (aperture present). A fine, detailed image was desired requiring the positioning of an aperture (1.2 mm). The laser q-switch rate was set at 5 kHz with a scan velocity of 5 inches/second. The laser was turned on an the image was laser etched into the part surface. The part was then wiped clean with a cloth and dipped into a 20 wt. % selenium oxide solution for 1.5 mins. and removed and flushed with water, followed by air drying. Separate runs were repeated for 20, 25, 30 and 32 Amps arc lamp current, with the best results obtained at 32 Amp.

EXAMPLE 5
Glass Mirrors

An image was acquired and processed into the computer as described above. A chrome coated glass mirror was (coated side down) suspended above a platen and held at all times within the laser beam's focus. The size and orientation of the image was adjusted. The laser power was set at 7.4 watts average power. The laser mode was TEMoo with an aperture in place. The laser q-switch rate was set at 5 kHz at a scan velocity of 5 inches/second. The laser was turned on an the image was laser etched through the coated mirror surface. In one experiment, the back of the mirror was painted with a black paint. In a second experiment with mirrors, a hologram was laminated onto the back of the etched mirror. This technique gave a brilliant spectrum of light when viewed through the front as the part moved and diffracted light waves. Separate runs were repeated for 20, 25, 30 and 32 Amps arc lamp current with 32 Amps preferred.

EXAMPLE 6
Leather

An image was acquired and processed into the computer as described above. A leather sample was placed within the laser scanning field on a platen to hold the part at all times in focus. The size and orientation of the image was adjusted. The laser power was set at 7.4 watts average power. The laser mode was multimode (no aperture present) since a bold image was desired. The laser q-switch rate was set at 5 kHz with a scan velocity of 2 inches/second. The laser was turned on an the image was laser etched into the part surface. Separate runs were repeated for 15, 20, 25, and 30 Amps of krypton arc lamp current. The best results were obtained when the arc lamp was set at 25 Amps, yielding adequately deep and clear markings in the leather.

Many other modifications and variations of the present invention are possible to the skilled practitioner in light of the teachings herein. It is therefore understood that, within the scope of the claims, the present invention can be practiced other than as herein specifically described.

What is claimed:

1. A method for creating a decorative contrast design on motorcycle and automobile parts comprising:

providing a metal motorcycle or automobile part having a surface;

providing a programmable laser assembly capable of emitting and scanning a laser beam having a desired fluence;

storing data representing a decorative contrast design;

adjusting the laser fluence;

selecting a scanning rate;

programming the laser assembly to pulse and orient the laser in a specified position to effect a reproducible decorative contrast design on the part surface;

directing the beam to the part surface;

scanning the beam over the part surface; and transferring the decorative contrast design onto the part by selectively laser etching part surfaces.

2. The method according to claim 1, further comprising laser etching the part to varying depths.

3. The method according to claim 1, wherein the laser etching is accomplished at a temperature below that which will burn or char the part surface.

4. The method according to claim 1, wherein the part is made from a material selected from the group consisting of aluminum, aluminum-containing alloys, stainless steel, nickel, nickel containing alloys, zinc, zinc alloys, carbon steel and titanium.

5. The method according to claim 1, wherein the laser is selected from the group consisting of excimer lasers, carbon dioxide lasers, and neodymium doped lasers.

6. The method according to claim 1, wherein the laser is a neodymium doped yttrium aluminum garnet laser.

7. The method according to claim 1, wherein the fluence of the laser is in the range of from about 0.5 mJ to about 250 mJ.

8. The method according to claim 1, comprising programming the laser assembly to pulse the laser at a rate from about 1 Hz to about 80 kHz.

9. The method according to claim 1, wherein the laser has a peak power of from about 1 watt to about 500 kilowatts.

10. The method according to claim 1, wherein the part has an ablation threshold.

11. The method according to claim 10 comprising scanning a laser beam having a peak power that exceeds the ablation threshold of the part.

12. The method according to claim 26, wherein the oxidizing agent is selected from the group consisting of selenium oxide, sodium nitrate, sodium dichromate, potassium nitrite, potassium nitrate and caustic soda.

13. The method according to claim 1, wherein the laser is moved relative to the part.

14. The method according to claim 1, wherein the part is moved relative to the laser.

15. The method according to claim 1, comprising providing a metal plated motorcycle or automobile part having a surface.

16. The method according to claim 15, wherein the metal plating is selected from the group consisting of chrome, anodized nickel, silver, gold, brass, copper and alloys thereof.

17. A method for creating a decorative contrast design on plastic motorcycle and automobile parts comprising:

providing a plastic motorcycle or automobile part;

providing a computer;

providing a programmable computer-controlled laser assembly capable of emitting and scanning a laser beam having a desired fluence;

storing data representing a decorative contrast design in the computer;

adjusting the laser fluence to affect a desired amount of material per pulse on the part;

programming the computer to pulse and orient the laser in a specified configuration to effect a reproducible desired decorative contrast design on the part;

directing the beam to the part;

scanning the beam over the part; and transferring the decorative contrast design onto the part by selectively exposing the part to the laser.

18. The method according to claim 17, wherein the laser is a neodymium doped yttrium aluminum garnet laser.

19. The method according to claim 17, wherein the fluence of the laser is in the range of from about 0.5 mJ to about 250 mJ.

20. The method according to claim 17, comprising programming the laser assembly to pulse the laser at a rate from about 1 Hz to about 80 kHz.

21. The method according to claim 17, wherein the laser has a peak power of from about 1 watt to about 500 kilowatts.

22. A method for creating a decorative contrast design on motorcycle and automobile mirrors comprising:

providing a mirrored glass part having a front surface and a back surface one of which is coated;

providing a computer;

providing a programmable computer-controlled laser assembly capable of emitting and scanning a laser beam having a desired fluence;

storing data representing a decorative contrast design in the computer;

adjusting the laser fluence to remove a desired amount of material per pulse from the part;

programming the computer to pulse and orient the laser in a specified configuration to effect a reproducible desired decorative contrast design on the part;

directing the beam to the mirror;

scanning the beam over the mirror;

transferring the decorative contrast design to the mirrored glass by removing sections of the mirror coating to effect the programmed decorative contrast design into the mirror; and coating the mirror to increase the contrast of the decorative design.

23. The method according to claim 22, wherein the coating is a painted coating.

24. The method according to claim 22, wherein the coating is a holographic coating.

25. The method according to claim 22, wherein the mirror is selected from the group consisting of back coated mirrors and first surface front coated mirrors.

26. The method of claim 1 comprising exposing the scanned part with an oxidizing agent to increase the contrast of the decorative design between etched and unetched surfaces.

* * * * *